United States Patent [19]

Nichols

[11] Patent Number: 5,260,110

[45] Date of Patent: Nov. 9, 1993

[54] MULTILAYER STRUCTURE HAVING A LAYER COMPRISED OF A BLEND OF POLYPHENYLENE ETHER AND HIGH IMPACT POLYSTYRENE

[75] Inventor: David K. Nichols, Pittsfield, Mass.

[73] Assignee: General Electric Company, Pittsfield, Mass.

[21] Appl. No.: 895,563

[22] Filed: Jun. 5, 1992

Related U.S. Application Data

[63] Continuation of Ser. No. 364,688, Jun. 9, 1989, abandoned.

[51] Int. Cl.$^5$ .................... B65D 71/00; B32B 27/08; C08F 29/12
[52] U.S. Cl. ........................... 428/2; 428/516; 428/518; 426/127; 426/412; 426/113; 525/316
[58] Field of Search .............. 428/516, 518, 2, 903.2; 525/316

[56] References Cited

U.S. PATENT DOCUMENTS

| | | |
|---|---|---|
| 3,383,435 | 5/1968 | Cizek et al. |
| 3,663,661 | 5/1972 | Katchman et al. |
| 3,748,218 | 7/1973 | Newman, Jr. et al. ............. 428/518 |
| 4,064,296 | 12/1977 | Bornstein et al. ................ 428/35 |
| 4,360,551 | 11/1982 | Guarino et al. |
| 4,389,436 | 6/1983 | Weiner . |
| 4,401,702 | 8/1983 | Hungerford . |
| 4,438,176 | 3/1984 | Steiner et al. |
| 4,439,493 | 3/1984 | Hein et al. |
| 4,447,494 | 5/1984 | Wagner, Jr. et al. |
| 4,513,120 | 4/1985 | Bennett, Jr. et al. |
| 4,543,291 | 9/1985 | Giles, Jr. et al. |
| 4,543,292 | 9/1985 | Giles, Jr. et al. |
| 4,564,558 | 1/1986 | Touhsaent et al. |
| 4,564,559 | 1/1986 | Wagner, Jr. et al. |
| 4,567,105 | 1/1986 | Giles, Jr. |

Primary Examiner—P. C. Sluby

[57] ABSTRACT

A multilayer packaging structure for microwave food reheating applications or for sterilized hot filling is provided having an outer layer prepared from a blend of polyphenylene ether and a high impact polystyrene. The polyphenylene ether-high impact polystyrene layer is useful as a structural support layer and provides resistance to distortion and burn through during microwave reconstitution or hot filling. The PPE/HIPS blend layer serves to increase the high temperature performance of the coextruded structure without sacrificing the thermoformability characteristics generally associated with HIPS based monolayer or multilayer structures. The ethylene vinyl alcohol or polyvinylidene chloride layers act as the oxygen barrier to prevent food spoilage and the polyolefin layer acts as a moisture barrier.

10 Claims, No Drawings

MULTILAYER STRUCTURE HAVING A LAYER COMPRISED OF A BLEND OF POLYPHENYLENE ETHER AND HIGH IMPACT POLYSTYRENE

This is a continuation of application Ser. No. 364,688, filed Jun. 9, 1989, now abandoned.

BACKGROUND OF THE INVENTION

1. Field of the Invention

This invention relates to mutilayer oxygen barrier pac aging for refrigerated or shelf stable microwave applications and, more particularly, relates to multilayer packaging having a supporting layer made from a blend of polyphenylene ether and high impact polystyrene.

2. Description of Related Art

Multilayer structures for use as packaging materials for storing foods have been known for some time. See, for example, Giles, Jr., et. al., U.S. Pat. No. 4,734,331, which discloses multilayered structures comprising at least one polycarbonate layer, at least one ethylene-vinyl alcohol copolymer layer, at least one polyolefin layer and suitable tie layers disposed between the layers to provide compatible adherence therebetween. Each layer provides the structure with desirable properties lacking in the other layers, for example, the polycarbonate layer provides the layer with heat resistance and impact resistance, the olefin vinyl alcohol copolymer layer provides the structure with oxygen barrier properties for inhibiting food spoilage, and the polyolefin layer acts as a water barrier. Although the employ of a polycarbonate layer in the aforementioned structure provides the structure with improved impact strength it may prove to be less cost effective than other alternatives. For example, high impact polystyrene layers have been employed in the past in similar multilayer structures for the purpose of cost effectively providing adequate mechanical properties to the structure. High impact polystyrene layers have, however, been found to generally lack the desired level of heat resistance necessary for microwaveable food packaging and some hot filling processes commonly used in the food industry. Specifically, outer layers of high impact polystyrene tend to exhibit burn through or distortion when adjacent to heat concentrating dense food portions, liquids or high grease or oil based foods during microwave or conventional oven cooking, reheating or high temperature sterilizing of foods resulting in the food items effectively burning through, melting or distorting the layer or layers resulting in either contamination of the food with melted resin or distortion of the package thereby leading to customer dissatisfaction.

Accordingly, one object of the present invention is to provide a multilayered structure for packaging that overcomes the foregoing thermal deficiencies of prior structures while retaining the desirable package forming qualities of high impact polystyrene.

SUMMARY OF THE INVENTION

The invention is directed to a multilayered structure comprised of at least one heat resistant polyphenylene ether/high impact polystyrene blend layer or ply, at least one ethylene-vinyl alcohol (EVOH) copolymer oxygen barrier layer or ply, and at least one polyolefin water barrier layer or ply. A polyvinylidene chloride (PVDC) oxygen barrier layer may be employed in place of the ethylene-vinyl alcohol copolymer layer. These layers or plies are bonded together by means of appropriate, relatively thin tie or adhesive layers. A regrind layer or trim layer may be used in the structure as well.

DETAILED DESCRIPTION OF THE INVENTION

In accordance with the instant invention there is provided a novel multilayer structure or laminate comprising at least one polyphenylene ether/high impact polystyrene (PPE/HIPS) blend layer, at least one EVOH copolymer layer or PVDC layer, and at least one polyolefin layer, the layers being tied or adhered together with a suitable tie layer disposed between the layers. A layer of trim or regrind may be positioned on either side of the EVOH or PVDC layers. In a preferred embodiment the polyphenylene ether/high impact strength polystyrene blend layer and the polyolefin layer comprise the outer layers and the EVOH layer or PVDC layer is an intermediate layer disposed between said PPE/HIPS layer and polyolefin layer and adhered thereto by means of suitable tie layers.

Polyphenylene ether/high impact polystyrene blends are known, e.g. Cizek, U.S. Pat. No. 3,383,435; Katchman, U.S. Pat. No. 3,663,661; and Bennett, Jr., et. al., U.S. Pat. No. 4,513,120, all of which are incorporated herein by reference.

The high impact polystyrenes have polystyrene resins enveloped by a if rubber. Suitable polystyrene matrix resins are derived from a monovinyl aromatic monomer, e.g., one having the formula:

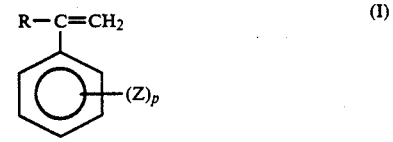

(I)

wherein R is hydrogen, (lower)alkyl, e.g., of from 1 to 4 carbon atoms or halogen; Z is hydrogen, vinyl, halogen or (lower)alkyl; and p is 0 or a whole number of from 1 to 5. Illustrative polystyrene matrix resins include homopolymers of polystyrene; polychlorostyrene; poly-γ-methylstyrene, polyvinyl toluene; and the like, or mixtures of the foregoing., These resins will also comprise the inclusions in the diene rubber membrane envelopes. The most preferred polystyrene is homopolystyrene.

The "rubber" used to envelope the polystyrene resin and provide the disperse phase includes polymeric materials, natural and synthetic, which are elastomers at room temperatures, e.g., 20° C. to 25° C. The term "rubber" includes, therefore, natural or synthetic rubbers of the diene elastomer type generally used in preparing impact polymers. All such rubbers will form a two phase system with the polystyrene resin, and will comprise the discontinuous phase in the impact resistant polystyrene resin composition. Illustrative rubbers for use in this invention are natural rubber and polymerized diene rubber, e.g., polybutadiene, polyisoprene, and the like, and copolymers of such dienes with vinyl monomers, e.g., vinyl aromatic monomers, such as styrene. Examples of suitable rubbers or rubbery copolymers are natural crepe rubber, synthetic SBR type rubber containing from 40% to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods, e.g., those employing heterogeneous catalyst systems, such as a trialkylaluminum and a titanium halide. Among the synthetic rubbers which may be used in preparing the present compositions are elastomeric modified diene homopolymers, e.g., hydroxy- and carboxy-terminated polybutadienes; polychlorobutadienes, e.g., neoprenes; copolymers of dienes, e.g., butadiene and isoprene, with various comonomers, such as alkyl unsaturated esters, e.g., methyl methacrylate; unsaturated ketones, e.g., methylisopropenyl ketone, vinyl heterocyclics, e.g., vinyl pyridine; and the like. The preferred rubbers comprise polybutadiene and rubbery copolymers of butadiene with styrene. Such preferred rubbers are widely used in forming rubber modified high impact polystyrene resins (HIPS) with a broad range of properties.

A suitable method for preparing the rubber modified polystyrene used in the present compositions is derived from the general disclosure in the above-mentioned British Patent No. 1,180,085, which deals with copolymers of methyl methacrylate and styrene. The particles of the elastomer enveloping polystyrene are provided, e.g., by polymerizing styrene in the presence of dissolved rubber under conditions to be specified whereby a continuous phase of such particles becomes dispersed in a polystyrene matrix.

In general, from 1.0 to 10 parts by weight of a diene rubber will be mixed with from 99 to about 90 parts by weight of styrene monomer to form a solution or dispersion. The solution or dispersion is then polymerized in bulk in the presence of from 0.01 to 2.0 parts by weight of a monomer soluble, water-insoluble initiator, such as benzoyl peroxide, dicumyl peroxide or a mixture thereof, at a temperature, e.g., of about 40° C. to 150° C., until a phase inversion occurs in which droplets of the homopolystyrene surrounded by the diene rubber membrane envelope are dispersed in a discontinuous phase. At this point, between about 5% and 35% of the styrene monomer has been polymerized. If necessary, the average particle size is adjusted by adding an appropriate quantity of a prepolymer solution having droplets of greater or smaller average particle size. Then the prepolymer system is either subjected to aqueous suspension polymerization or to a bulk polymerization without substantial stirring, using in either case the same or different initiator and a temperature in the range of, for example, 40° C. to 150° C., and for the suspension case a suspending agent, such as barium sulfate, calcium phosphate, polyvinyl alcohol, a polyacrylate salt, or the like.

The PPE/HIPS blends are prepared by combining such a rubber modified polystyrene resin with a polyphenylene ether. The polyphenylene ethers are self-condensation products of monohydric monocyclic phenols produced by reacting the phenols with oxygen in the presence of complex copper catalysts. In general, molecular weight will be controlled by reaction time, longer times providing a higher average number of repeating units.

The polyphenylene ethers (also known as polyphenylene oxides) used in the present invention comprise a plurality of structural units having the formula:

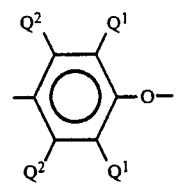  (II)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinyl aromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen.

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874; 3,306,875; 3,914,266 and 4,028,341. They are usually combinations of cuprious or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide.

A preferred family of polyphenylene ethers will have repeating structural units of the formula:

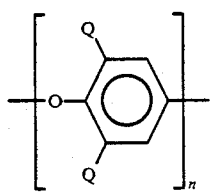

(III)

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atoms, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl-1,4-phenylene) ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene) ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene) ether; poly(2-ethoxy-1,4-phenylene)ether; poly(2-chloro -1,4-phenylene)ether; poly(2,5-dibromo-1,4-phenylene)ether; and the like.

For purposes of the present invention an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are: poly(2,6-di-methyl -1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly-(2-ethyl-6-propyl-1,4-phenylene)ether; and the like.

The most preferred polyphenylene ether resin for purposes of the present invention is poly(2,6-dimethyl-1,4-phenylene)ether. This resin readily forms a compatible and single phase composition with the relevant polystyrene resins over the entire range of combining ratios.

The preparation of PPE resins is well-known in the art and is described, for example, in U.S. Pat. No. 3,306,874; 3,306,875; and 3,432,469 of Allan Hay; and U.S. Pat. Nos. 3,257,357 and 3,257,358 of Gelu Stamatoff, all incorporated herein by reference.

As is described in the above-mentioned U.S. Pat. No. 3,383,435, polyphenylene ethers and polystyrene resins are compatible with each other in all proportions and they exhibit a single set of thermodynamic properties. The present compositions therefore can comprise from 5% to 95% by weight polyphenylene ether resin and from 95% to 5% by weight high impact polystyrene resin, and these are included within the scope of the invention. In general, compositions in which the polyphenylene ether resin comprises from about 10% to about 70% by weight of the total resinous components, are preferred because layers made therefrom have the best combination of impact strength, surface appearance and resistance to heat and to solvents. Particularly useful and preferred are compositions in which the polyphenylene resin component comprises from 15% to 50% by weight of the combined weight of polyphenylene ether and high impact polystyrene and the polystyrene is present at a level of from 50% to 85% by weight based on the combined weight of polyphenylene ether and polystyrene.

The amount of polyphenylene ether employed in the blend should be an amount sufficient to raise the heat distortion temperature (HDT) performance range of the blend to the desired level. It is desirable to employ no more polyphenylene ether than necessary to obtain the desired level of temperature performance. Unnecessarily high levels of polyphenylene ether in the blends adds expense to the blends, adds cycle time to thermoforming of the multilayer structures, and may require equipment modification of existing multilayer processing equipment.

The method used to form the compositions of the PPE/HIPS blend layer of the invention is not critical provided that it permits efficient dispersion and mixing. The preferred method is one in which the polyphenylene ether is mixed with the rubber modified polystyrene using any conventional mixing method and the composition so formed may be coextruded with the other layers and subsequently thermoformed into a desired shape for filling. The thermoformed structures provide microwaveable or hot fillable packaging for food stuffs.

The polyolefins which comprise the other exterior layer in the multilayer structure of the instant invention, are well known in the art and are generally commercially available. Typical of the polyolefins are polyethylene, polypropylene, or any of the polyolefins derived from olefin monomers having from two to about eight carbon atoms. Copolymers of the above may be employed and are included within the term polyolefin. Examples of copolymers include copolymers of ethylette and propylene or ethylene and butene. The term copolymers includes the usual copolymers, that is, random, random block, and block copolymers. Various densities of polyolefins can be employed in this invention and include high density polyethylene, linear low density polyethylene and low. density polyethylene. The preferred polyolefin is polypropylene.

PVDC can be obtained by the polymerization of vinylidene chloride and will have repeating units of the formula:

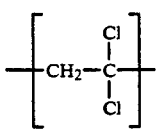
(IV)

Polyvinyl chloride is commercially available.

The EVOH copolymers which comprise the third layer of the multilayer structure of the instant invention are known in the art, and are disclosed, inter alia, in U.S. Pat. No. 3,585,177, which is hereby incorporated herein by reference. These EVOH copolymers may be prepared by hydrolyzing olefin vinyl esters. Ethylene is used in the preparation of the EVOH.

Suitable vinyl esters which can be copolymerized with the olefin monomers and subsequently hydrolyzed to form the EVOH copolymers include vinyl ester monomers of the general formula:

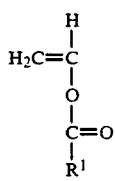
(V)

wherein $R^1$ is selected from hydrogen, alkyl radicals of from 1 to about 10 carbon atoms, and aryl radicals of from 6 to 12 carbon atoms. Some illustrative non-limiting examples of these vinyl esters include vinyl formate, vinyl acetate, vinyl propionate, vinyl butyrate, and vinyl benzoate.

The preferred EVOH copolymers are ethylene vinyl alcohol copolymers have from 5 to 40 weight percent based on the weight of the copolymer. Especially preferred are ethylene vinyl alcohol copolymers wherein the ethylene content is from 8.9 to 36.7 weight percent. Most especially preferred are ethylene vinyl alcohol copolymers wherein the ethylene content is from 12 to 29.8 weight percent.

The residual ester content of the copolymer should be less than 3% and preferably less than 2% by weight. Most preferably the ester content is less than 1% by Weight. The preferred EVOH copolymers contain less than 2% homopolymers, and preferably less than 1% homopolymers.

The term EVOH copolymers also includes those copolymers containing a synthetic or natural rubber component such as butadiene, isoprene, natural rubbers, acrylonitrile-butadiene-styrene terpolymers, ethylene-propylene copolymers and terpolymers, chlorinated rubbers, and the like.

The tie layers joining the PPE/HIPS, EVOH, regrind and polyolefin layers together may consist of any of the known adhesive materials which serve to bind or adhere these materials together and which are compatible with these materials. However, among these materials two types of materials are particularly preferred for use in the tie layers of the instant invention. The first type of these materials are the olefin vinyl ester copolymers. These olefin vinyl ester copolymers are well known in the art and are generally commercially available. These esters are prepared by the copolymerization of an olefin and a vinyl ester. The olefins used in the preparation of the olefin vinyl esters are the lower alpha olefins of from 2 to 4 carbon atoms. An especially preferred olefin is ethylene.

The vinyl esters which can be copolymerized with the olefins are the vinyl ester monomers. A particularly useful vinyl ester is vinyl acetate.

The preferred tie layers of this type are those comprised of ethylene vinyl acetate copolymers. Especially preferred ethylene vinyl acetate copolymers are those wherein the acetate content is from about 15 to about 35 percent based on the weight of the copolymer.

The second type of material which functions as an effective tie layer in the instant invention is a modified polyolefin containing 0.01-10 weight percent of an unsaturated carboxylic acid or anhydride component. The polyolefins used in the tie layer include homopolymers of alpha-olefins such as ethylene and propylene and copolymers of ethylene and other alpha olefins such as ethylene-propylene copolymers, ethylene-butene-1 copolymers, ethylene-hexane-1 copolymers and copolymers of alpha-olefins such as propylene-butene-1 copolymers.

These homopolymers and copolymers can be used as a blended mixture. The unsaturated carboxylic acids and anhydrides thereof include acrylic acid, methacrylic acid, maleic acid, fumaric acid, itaconic acid, 3,6-endomethylene tetrahydro phthalic acid and anhydrides thereof. It is especially preferable to use acrylic acid or maleic anhydride. The modified polyolefins can be produced by graft-polymerizing said unsaturated carboxylic acid or anhydride to a polyolefin.

The graft-polymerization can be carried out by a method of melt blending a polyolefin and said unsaturated carboxylic acid or anhydride with a catalyst in an extruder; or a method of mixing said unsaturated carboxylic acid or anhydride and a catalyst with a suspension of polyolefin in a medium and heating the mixture with stirring.

The modified polyolefin should contain an unsaturated carboxylic acid component in an amount of 0.01 to 10 weight percent so as to give desirable adhesive strength.

These modified polyolefins may be blended with 40-3 weight percent of a rubber component having a Mooney viscosity 50 $ML_{1+4}(100°\ C.)$ of 40-150 preferably 40-100 in accordance with ASTM D15. The typical rubber components include natural rubber and synthetic rubbers such as styrene-butadiene rubber, acrylonitrile-butadiene rubber, acryl rubber, urethane rubber, butyl rubber, chloroprene rubber, silicone rubber, polybutadiene rubber, ethylene-propylene rubber, and the like. The preferred rubbers are the ethylene-propylene rubber and ethylene-propylene terpolymer having a third component of ethylidene or bornene.

These modified polyolefins are described in more detail, in U.S. Pat. No. 4,058,647, which is hereby incorporated herein by reference.

Suitable tie layer materials include maleic anhydride graft polyethylene, maleic anhydride graft polypropylene, and modified ethylene vinyl acetate having 22% by weight vinyl acetate.

The multilayer structures can be readily prepared by standard techniques, including co-extrusion through a feedblock or combination in the die. The thickness of the layers may vary substantially and are obviously somewhat dependant upon the final use to which the multilayer structure will be applied. Generally, the PPE/HIPS blend layer, EVOH, regrind and polyolefin layers have a thickness of from about 1.0 mil to about 60 mils each, and more likely from about 1.0 mil to about 30 mils. The tie layers are usually significantly thinner than the PPE/HIPS, EVOH, regrind and polyolefin layers. The thickness of the tie layers is a thickness which is effective to adhere or bond the PPE/HIPS blend, EVOH, regrind and polyolefin layers together. Generally this thickness is less than about 1 mil, although tie layers up to about 5 mils thick can be employed.

The multilayer structures of the instant invention contain at least one PPE/HIPS blend layer, at least one EVOH layer or PVDC layer, and at least one polyolefin layer. It may or may not have a regrind layer. These layers are adhered together by means of a thin tie layer of the aforedescribed adhesive materials interposed between each of these layers. In the instant multilayer structure the PPE/HIPS blend, EVOH, and polyolefin layers need not be arranged in any particular manner. Thus, for example, in a three layer structure containing one PPE/HIPS blend layer, one EVOH layer, and one polyolefin layer bonded together by a tie layer interposed intermediate each of these layers the PPE/HIPS blend layer may be adjacent to and bonded to either the EVOH layer or the polyolefin layer; the EVOH layer may be adjacent to and bonded to either the PPE/HIPS blend layer or the polyolefin layer; or the polyolefin layer may be adjacent to and bonded to either the PPE-/HIPS blend or the EVOH layer. That is to say, in a three layer structure the PPE/HIPS blend layer and the polyolefin layer may be the outer layers and the EVOH layer may be the inner layer disposed intermediate said PPE/HIPS blend and polyolefin outer layer or the PPE/HIPS blend and the EVOH layers may be the outer layers and the polyolefin layer may be the inner layer disposed intermediate said PPE/HIPS blend and EVOH outer layers.

Preferably the PPE/HIPS blend layer is the exterior layer and supportive of the inner layer and the food product. The incorporation of PPE in the support layer will increase the layers resistance to burn-through or distortion during microwave cooking or a hot-filling process during the packaging process.

A preferred structure has an outer PPE/HIPS blend layer, an inner barrier layer of EVOH or PVDC, and an outer layer of either polyethylene or polypropylene with tie layers between adjacent layers to adhere the layers together. An inner regrind layer may be employed comprising a melt blend of the aforementioned PPE/HIPS/EVOH/PVDC/PE or PP and tie layer materials.

In the multilayer structures of the instant invention the tie layers may be the same or they may be different. Thus, for example, in a three layer structure containing two tie layers both of these tie layers may be the same or one tie layer may be comprised of one of the preferred aforedescribed materials while the second tie layer is comprised of a different tie material.

The multilayer structure will be thermoformed into a variety of package or container structures including trays, cups, bowls, cans, dishes, etc.

A particularly useful multilayer structure of the instant invention is a three layer structure comprised of a PPE/HIPS blend outer layer, a polyolefin outer layer, and an EVOH inner layer disposed intermediate said PPE/HIPS and polyolefin outer layers and bonded thereto by tie layers disposed intermediate said inner layer and said two outer layers. Suitable structures can have the following orders: (a) PPE-HIPS Blend layer/regrind layer/tie layer/EVOH layer/tie layer/polyethylene layer; and (b) PPE-HIPS blend layer/regrind layer/tie layer/EVOH layer/tie layer/polypropylene.

In preparing the laminates or containers of the instant invention there can be significant wastage of the multilayer material. An example of such material is the scrap material prepared when the pinch-off is made in coextrusion blow molding or edge trim from cast coextrusion sheet thermoforming process. This reground material can be employed as a regrind layer in the multilayer structure. The PPE/HIPS blend, polyolefin, and EVOH layers are a major portion of the regrind composition while the tie layers are a minor portion of the regrind composition. Generally, the PPE/HIPS blend, polyolefin, and EVOH constitute above about 85 weight percent of the regrind, preferably above about 90 weight percent of the regrind. The tie materials constitute below about 15 weight percent of the regrind, preferably below about 10 weight percent of the regrind. Weight percent of the regrind, as regards the tie material and the PPE/HIPS blend, polyolefin, and EVOH is determined based on the total amounts of the tie material and the PPE/HIPS blend, polyolefin, and EVOH present in the regrind.

Generally, the instant regrind compositions contain:
(i) from about 0.5 to about 89 weight percent polyphenylene ether;
(ii) from about 0.5 to about 89 weight percent high impact polystyrene;
(iii) from about 1 to about 60 weight percent EVOH or PVDC;
(iv) from about 2 to about 85 weight percent polyolefin; and
(v) from about 0.5 to about 25 weight percent of at least one tie material selected from the olefin vinyl esters and the modified polyolefins described hereinafore.

Preferred regrind compositions comprise:
(i) from about 1 to about 77 weight percent polyphenylene ether;
(ii) from about 1 to about 77 weight percent high impact polystyrene;
(iii) from about 1 to about 30 weight percent EVOH or PVDC;
(iv) from about 5 to about 80 weight percent polyolefin; and
(v) from about 1 to about 20 weight percent of at least one tie material selected from olefin vinyl esters and modified polyolefins.

The multilayered structures employing a supportive polyphenylene ether/high impact polystyrene blend outer layer may be downgaged in thickness to reduce the subsequent material usage and lower unit costs while resulting in higher temperature performance ranges than similar/thicker structures employing outer layers consisting of high impact polystyrene. The multilayer structures of the present invention are therefore cost effectively useful as high temperature performance packaging for food stuffs as needed for microwaveable foods or foods that require hot filling as a means of sterilizing or cooking the foodstuffs.

What is claimed:

1. A multilayer structure resistant to burn-through or distortion during microwave cooking or a hot-filling process, comprising:
   (i) a polyphenylene ether/high impact polystyrene blend layer;
   (ii) an ethylene-vinyl alcohol copolymer layer; and
   (iii) a polyolefin layer; said layers being adhered together by means of tie layers disposed therebetween.

2. A multilayer structure resistant to burn-through or distortion during microwave cooking or a hot-filling process, comprising:
   (i) a polyphenylene ether/high impact polystyrene blend layer;
   (ii) a regrind layer having from:
      (a) about 15 to about 89 weight percent polyphenylene ether;
      (b) from about 0.5 to about 89 weight percent high impact polystyrene; and
      (c) from about 1 to about 60 weight percent ethylene-vinyl alcohol copolymer;
   (iii) an ethylene-vinyl alcohol copolymer layer; and
   (iv) a polyofin layer; said layers being adhered together by means of tie layers disposed therebetween.

3. A multilayer structure resistant to burn-through or distortion during microwave cooking or a hot-filling process, comprising:
   (i) a polyphenylene ether/high impact polystyrene blend layer;
   (ii) a polyvinylidene chloride layer; and
   (iii) a polyofin layer; said layers being adhered together by means of tie layers disposed therebetween.

4. A multilayer structure resistant to burn-through or distortion during microwave cooking or a hot-filling process, comprising:
   (i) a polyphenylene ether/high impact polystyrene blend layer;
   (ii) a regrind layer having from:
      (a) about 15 to about 89 weight percent polyphenylene ether;
      (b) from about 0.5 to about 89 weight percent high impact polystyrnee; and
      (c) from about 1 to about 60 weight percent ethylene-vinyl alcohol copolymer;
   (iii) a polyvinylidene chloride layer; and
   (iv) a polyofin layer; said layers being adhered together by means of tie layers disposed therebetween.

5. The multilayer structure of claim 1 wherein said polyphenylene ether/high impact polystyrene blend layer comprises a blend containing polyphenylene ether resin present at a level of from 15 percent to 50 percent by weight of the blend, said blend containing high impact polystyrene at a level of from 50 percent to 85 percent by weight of said blend.

6. The multilayer structure of claim 5 wherein said polyphenylene ether is poly(2,6-dimethyl-1,4-phenylene)ethel:

7. The multilayer structure of claim 5 wherein said polyphenylene ether is poly(2,3,6-trimethyl-1,4-phenylene)ether.

8. The multilayer structure of claim 3 wherein said polyphenylene ether/high impact polystyrene blend layer comprises a blend containing polyphenylene ether resin present at a level of from 15 percent to 50 percent by weight of the blend, said blend containing high impact polystyrene at a level of from 50 percent to 85 percent by weight of said blend.

9. The multilayer structure of claim 8 wherein said polyphenylene ether is poly(2,6-dimethyl-1,4-phenylene)ether.

10. The multilayer structure of claim 8 wherein said polyphenylene ether is poly(2,3,6-trimethyl-1,4-phenylene)ether.

* * * * *